M. & W. SPORLEDER.
BALANCE WHEEL.
APPLICATION FILED JAN. 5, 1912.
1,028,794.
Patented June 4, 1912.
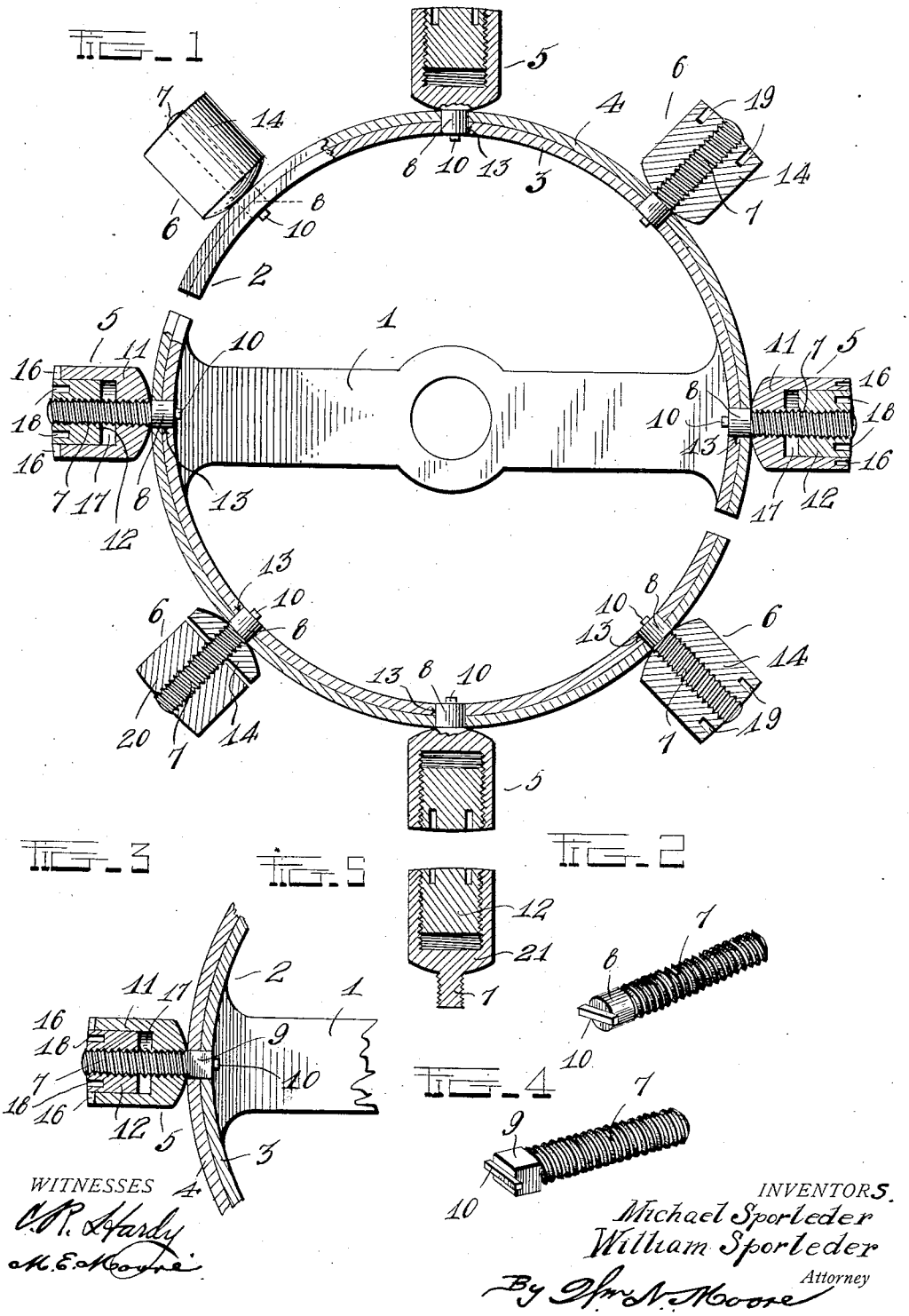
WITNESSES
INVENTORS
Michael Sporleder
William Sporleder
By  Attorney

UNITED STATES PATENT OFFICE.

MICHAEL SPORLEDER, OF COLORADO CITY, COLORADO, AND WILLIAM SPORLEDER, OF OKEMAH, OKLAHOMA.

BALANCE-WHEEL.

1,028,794.    Specification of Letters Patent.    Patented June 4, 1912.

Application filed January 5, 1912. Serial No. 669,676.

*To all whom it may concern:*

Be it known that we, MICHAEL SPORLEDER and WILLIAM SPORLEDER, citizens of the United States, residents, respectively, of Colorado City, in the county of El Paso and State of Colorado, and Okemah, in the county of Okfuskee and State of Oklahoma, have invented certain new and useful Improvements in Balance-Wheels, of which the following is a specification.

Our invention relates to improvements in balance wheels designed particularly to overcome the serious defects and objections found by experience to exist in the common form of balance wheel in general use.

In balance wheels in general use certain serious defects in the balance screws used upon the balance rims are experienced. First, the screw or weight commonly used in balance wheels of the present type is objectionable because it is necessary to tap the rim of the balance wheel, which in many instances, ruptures or fractures the rim or the soldered juncture of the two welded elements of the rim, and thus the sensitiveness of the two metals, usually brass and steel, becomes defective and fails to respond promptly to the variable degrees of temperature. Second, the head of the screw is generally projected inwardly so far from the rim as to render the screw liable to vibration, which vibration is fatal to accuracy of adjustment and perfect time keeping. Third, the head of the screw is outside the orbit of the intermediate screws, thereby interrupting the atmospheric path of the intermediate or common screws of the balance wheel, which obstruction is further augmented by the long rough screw extending inwardly or outwardly to the detriment of accurate time keeping. Fourth, in addition to these objections as to tapping the rim, vibration of the screw, and air resisting devices, a further objection is experienced in that the part of the screw contacting with the rim is undercut, and being screwed on the rim tightly, exercises an inwardly directed leverage on the rim, which is highly detrimental to both the threaded bore of the rim and the screw threads of the screws.

This invention therefore, has for its principal object the provision of a balance wheel which will overcome these serious defects and provide simple and efficient means for securing the balance screws to the rim of the balance wheel.

Other objects of the invention are to provide an inexpensive balance screw for use in connection with the ordinary balance wheel now in use, which screw will be capable of permitting positive and accurate adjustment of the balance wheel; which will have a positive and tight engagement with the rim, and which in general, will provide efficient, practical and simple means for accomplishing the desired purposes.

To attain the desired objects, the invention broadly stated, consists in the provision of a balance wheel embodying novel features of construction and combination of parts, substantially as disclosed herein.

In order that the details of construction of the invention may be clearly understood and its ready mode of application and general efficiency be fully appreciated, we have illustrated in the accompanying drawing several types of balance screws embodying the practical application of the principles of the invention, it being understood that many modifications may be made without departing from the spirit and scope of the invention or sacrificing any of its advantages.

Figure 1 is a face view, partly in section, of a balance wheel equipped with our improvements, for purposes of illustration, several forms of screws being shown secured in the rim and the screws being shown in section to clearly illustrate their peculiar construction. Fig. 2 is a perspective view of the preferred form of threaded bolt used in connection with the balance screw. Fig. 3 is a sectional view of the preferred form of balance screw in applied position upon the rim of the balance wheel, a fragment of the balance wheel and rim being shown to illustrate the method of attachment upon the rim. Fig. 4 is a perspective view of a slightly modified form of screw bolt, and Fig. 5 is a sectional view of the ordinary balance screw equipped with one form of our improvement.

In the drawings, in which we have employed similar characters of reference to denote corresponding parts in the several views:—the numeral 1 designates the cross arm of a balance wheel 2, of any suitable size or make, and provided with the usual inner rim of steel 3, and the outer rim of brass or the like 4, the mean time screws being indicated generally by the numeral 5 and the intermediate or common screws by the numeral 6.

Our invention consists in the provision of the threaded bolt 7, provided with the inner head 8, preferably of cylindrical shape, but in Fig. 4 shown as formed with a squared or quadrangular shaped head 9, which in both forms is provided with the key or rib 10. By reference to Fig. 1, it will be seen that the bolt 7 is screwed into the threaded shell 11 of the mean time screw 12, and has its head projected inwardly to fit into and be retained in the smooth bored opening or socket 13 through the rim of the balance wheel, the key or rib 10 being disposed within the balance rim and engaging against the inner periphery thereof to form a simple and easily removable locking means for retaining the bolt in adjusted position. From this construction, it will be noted that the key 10 rests cross-wise upon the inner periphery of the rim so as to offer no resistance to the free movement of the rim, and that the bolt may be used either upon the mean time screw shell 11 or the intermediate screw 14, as desired. It will also be observed that the screw threaded shell retains the screw bolt key in tight engagement with the rim upon the inside of the rim, while all possibility of injuring the rim or soldered joint of the steel and brass sections owing to the presence of screw threads is eliminated, because a smooth bored opening or socket is employed, while if the two sections had not been united at this point, as is often the case, this clamping feature of the bolt will entirely obviate the necessity of such union, and in fact, provides a more efficient and improved joint, for the reason that the bolts will hold the sections firmly in place, while allowing for the usual contraction and expansion of the metals. Furthermore, it will be seen that both the mean time screws and the common or intermediate screws travel in the same relative atmospheric path, and thus an even and impartial distribution of the atmospheric pressure is assured.

The shell 11 of the screw 13 is sometimes slotted as at 16 to admit of the insertion of a suitable tool for adjusting the same, and is provided with a central socket 17 to permit the mean time screw 12 to work into, when necessary. The mean time screw 12 is also slotted on either side of the bolt as at 18 to permit of adjustment, the slots 18 being shallow and arranged at opposite points to equalize the distribution of the atmospheric pressure, which function we have found by experience, that a single centrally disposed slot fails to perform.

The intermediate screw 14 is of simple nut-like construction and is provided with a central interiorly threaded bore to engage the threaded bolt 7, and has the perforations or slots 19 for adjusting purposes. The screw 14 may also be provided with the counterweight 20, which may be screw threaded and forms a construction somewhat similar to a nut lock, and by this construction a simple means is provided for changing the weight of the balance when necessary.

In Fig. 5 is shown a modified construction of our mean time screw applied to the screw in ordinary use. In this figure, the mean time screw 12 is located inside of the ordinary screw 21 by turning in the screw 21 to the rim of the balance and cutting off a portion of the screw bolt 7. The head of the screw 21 is counterbored and screw threaded for the mean time screw on much the same principle as used in the mean time screw and shell. This construction thus enables the old style screw to be used, if desired, and combines with the points of merit hereinbefore pointed out as incident to the use of our improvement, with the additional feature of the use of the old type screw.

From the above description, taken in connection with the accompanying drawing, it will be seen that we have accomplished the desired objects hereinbefore set forth in a simple, practical and inexpensive manner.

We claim:—

1. A balance wheel having a series of openings in its periphery, a series of screws having their inner ends mounted in said openings, an adjustable shell mounted on the screws, and a weight engaging the shells and adjustable on the screws.

2. In a balancing device for balance wheels, the combination with a screw bolt having its inner end smooth to engage a smooth bored opening in the periphery of a balance wheel, of a shell adjustably mounted upon the screw bolt.

3. A balancing device for balance wheels, comprising a screw bolt adapted to engage the periphery of a balance wheel, and a shell mounted upon said screw bolt and provided with adjusting slots in its outer end.

4. A balancing device for balance wheels, comprising a screw bolt adapted to engage the periphery of a balance wheel, a shell mounted upon said screw bolt and provided with adjusting slots in its outer end, and an adjustably mounted weight carried by the screw bolt and engaging the shell.

5. A balancing device for balance wheels, comprising a screw bolt adapted to engage the periphery of a balance wheel, a shell mounted upon said screw bolt and provided with a pair of oppositely disposed slots whereby the shell may be adjusted laterally upon said screw bolt, and a device adjustably mounted on said screw bolt and contained within the shell and provided with a pair of slots whereby it may be adjusted laterally upon the screw bolt.

6. A balancing device for balance wheels, comprising a screw bolt engaging the periphery of a balance wheel, a shell adjustably mounted upon the screw bolt, and a device carried by said screw bolt and contained within the shell and adjustable laterally upon said screw bolt independently of the shell.

In testimony whereof we affix our signatures in the presence of two witnesses.

MICHAEL SPORLEDER.
WILLIAM SPORLEDER.

Witnesses as to the signature of Michael Sporleder:
WALTER F. MEYER,
S. M. HIGH.

Witnesses as to the signature of William Sporleder:
V. K. CHOWNING,
MILTON W. REEVES.

---

Copies of this patent may be obtained for five cents each, by addressing the "Commissioner of Patents, Washington, D. C."